United States Patent Office

3,240,791
Patented Mar. 15, 1966

3,240,791
PREPARATION OF 2,3-DIHYDROPYRAN FROM TETRAHYDROFURFURYL ALCOHOL
William I. Denton, Cheshire, Conn., assignor to Olin Mathieson Chemical Corporation, a corporation of Virginia
No Drawing. Filed Jan. 16, 1963, Ser. No. 251,733
2 Claims. (Cl. 260—345.1)

This invention relates to a process for the preparation of 2,3-dihydropyran from tetrahydrofurfuryl alcohol. More particularly, this invention relates to a novel catalytic process for the preparation of 2,3-dihydropyran from tetrahydrofurfuryl alcohol.

It is known in the art that 2,3-dihydropyran can be prepared by passing tetrahydrofurfuryl alcohol in the vapor phase over an alumina catalyst at a temperature of about 375° C. and that a 42 percent yield of 2,3-dihydropyran can be obtained. Similar results have been obtained when the same process have been carried out in the presence of a thoria catalyst. In U.S. Patent 2,365,623 there is described a process for the production of 2,3-dihydropyran in which tetrahydrofurfuryl alcohol in the vapor phase is subjected to the action of a catalyst which consists essentially of a co-precipitated mixture of alumina and aluminum phosphate (referred to as basic aluminum phosphate) at a temperature between 200° C. and 500° C. In this process, the yield of 2,3-dihydropyran was 65 percent. The processes known in the art suffer from several disadvantages. It has been found, for example, that the prior art catalysts must be regenerated after three or four passes and that these catalysts can be regenerated only by treatment at high temperatures. In some instances the recovered unreacted tetrahydrofurfuryl alcohol cannot be recycled to the process and this results in a considerable reduction in overall yield.

In the process of this invention it has been found that tetrahydrofurfuryl alcohol can be conveniently converted to 2,3-dihydropyran in high yield by contacting the tetrahydrofurfuryl alcohol in the vapor phase with a vanadia catalyst. In this process the formation of coke, which reduces the catalyst activity, is substantially less than that experienced with the catalysts employed by others and, in addition, unreacted 2,3-dihydropyran can be recycled over the catalyst thus improving the overall yield.

In the process of this invention the temperature of the reaction can be varied widely from about 350° to about 500° C. with the preferred temperature range being from about 375° C. to about 450° C. Residence time is not a critical factor in the process of this invention. Residence times of from 2 to 20 seconds are suitable although the preferred residence time is from about 2 to 10 seconds.

Although the reaction is conveniently carried out at atmospheric or slightly above atmospheric pressure, higher pressures can be employed and, in addition, sub-atmospheric pressures may be utilized if desired.

The novel process of this invention can be conveniently carried out in a continuous manner. Vaporized tetrahydrofurfuryl alcohol can be passed through a heated reaction zone where it is contacted with the vanadia catalyst. The resulting reaction product mixture is then passed through a condenser and the condensate thus formed is distilled to separate the 2,3-dihydropyran product from the unreacted alcohol which can be returned to the reaction zone for further processing. If desired, the tetrahydrofurfuryl alcohol, in vapor form, can be passed into the reaction zone entrained in an inert carrier gas such as nitrogen or any other gas inert to the reaction. After condensation of the product vapors from the reactor exit stream, the inert carrier gas can be recycled to the process.

The catalyst which is employed is a vanadia catalyst. Ordinarily the catalyst is vanadium pentoxide although the lower oxides of vanadia are also effective. A wide variety of catalyst supports such as alumina or bauxite, in activated or unactivated form, can be utilized. The percentage by weight of the vanadium oxide on the support can be varied from about 5 percent to about 30 percent based on the total weight of the oxide and the support with the preferred amount of vanadium oxide being from about 10 percent to about 20 percent by weight based on the total weight of the oxide and support.

The invention is more fully illustrated by the following examples. It is to be understood, however, that these examples are for the purpose of illustration and are not to be considered as limiting in any way the scope of this invention.

EXAMPLE I

*Preparation of vanadia catalyst*

A catalyst consisting of 20 percent by weight of vanadium pentoxide on activated alumina was prepared as follows:

125 grams of activated alumina (4–8 mesh) was placed in a filter flask which was connected to a vacuum pump through a three-way stopcock. The flask containing the alumina was evacuated for 1 hour. In the next step, 35 grams of ammonium metavanadate was dissolved in 750 cc. of distilled water at 90° C. and the hot solution was placed in dropping funnel attached to the top of the filter flask through a rubber stopper. The vacuum pump was turned off and the filter flask contents isolated under vacuum by turning off the three-way stopcock. In the next step the solution was added to the alumina in small portions with shaking after each addition. The resulting mixture was then evaporated to dryness with continual stirring to distribute the precipitate evenly over the support after which it was dried overnight in an oven at 150° C. In the final step the catalyst was heated in a muffle furnace at 500° C. for 16 hours.

*Preparation of 2,3-dihydropyran*

Tetrahydrofurfuryl alcohol was passed at atmospheric pressure over a portion of the catalyst prepared as described in this example at a temperature of 400° C. and at the rate of 1 volume of tetrahydrofurfuryl alcohol per hour per volume of the catalyst. This is equivalent to a residence time of about 6 seconds. A total of 382 grams of tetrahydrofurfuryl alcohol was passed over the catalyst during the 3.0 hour run. The gaseous reaction mixture leaving the reaction chamber was passed through a condenser and there was recovered 342 grams of liquid reaction products. By analysis it was determined that the yield of 2,3-dihydropyran was 56 mole percent based on the tetrahydrofurfuryl alcohol charged to the reactor.

EXAMPLE II

This experiment was conducted in the same manner as that described in Example I with a quantity of catalyst whose preparation was described in Example I. Tetrahydrofurfuryl alcohol was passed over the catalyst at the rate of 1 volume of tetrahydrofurfuryl alcohol per hour per volume of catalyst at a temperature of 475° C. During the 3.0 hour run a total of 475 grams of tetrahydrofurfuryl alcohol was passed over the catalyst. The liquid products in the amount of 335 grams were subjected to analysis and it was shown that the yield of 2,3-dihydropyran was 44 mole percent based on the alcohol introduced.

EXAMPLE III

Tetrahydrofurfuryl alcohol was passed over the catalyst whose preparation was described in Example I at a temperature of 300° C. and at a rate of 1.0 volume of alcohol per hour per volume of catalyst. During the 3.0 hour run a total of 384 grams of alcohol was passed over the catalyst. Liquid products in the amount of 385 grams were recovered and by analysis it was determined that the yield of 2,3-dihydropyran was 7 mole percent based on the alcohol charged.

What is claimed is:

1. A process for the preparation of 2,3-dihydropyran which comprises contacting tetrahydrofurfuryl alcohol in the vapor phase at a temperature of from about 350° C. to about 500° C. with a catalyst consisting essentially of vanadium pentoxide on an inert solid support, the amount of the said oxide being from about 5 percent to about 30 percent based on the combined weight of the oxide and the support.

2. The process for the preparation of 2,3-dihydropyran which comprises contacting tetrahydrofurfuryl alcohol in the vapor phase at a temperature of from about 350° C. to about 500° C. with a catalyst consisting essentially of vanadium pentoxide on an activated alumina support, the amount of the said vanadium pentoxide being from about 5 percent to about 30 percent based on the combined weight of the pentoxide and the support.

References Cited by the Examiner

UNITED STATES PATENTS

| 2,365,623 | 12/1949 | Bremmer et al. | 260—345.1 |
| 2,513,133 | 6/1950 | Hatch et al. | 260—345.9 |
| 2,680,118 | 6/1954 | Emerson et al. | 260—345.9 XR |
| 2,976,299 | 3/1961 | Manly | 260—345.1 |
| 3,056,788 | 10/1962 | Brader | 260—268 |

OTHER REFERENCES

Elderfield: Heterocyclic Compounds, vol. I, pp. 348–349, John Wiley & Sons, Inc., New York (1950).

Sabatier: Catalysis in Organic Chemistry, second edition, page 240, entry No. 675, D. Van Nostrand Co., New York (1923).

IRVING MARCUS, *Primary Examiner.*

NICHOLAS S. RIZZO, WALTER A. MODANCE,
*Examiners.*